United States Patent [19]

Walsh

[11] Patent Number: 5,794,812
[45] Date of Patent: Aug. 18, 1998

[54] CARTON, CARTON BLANK AND METHOD FOR FORMING THE CARTON

[75] Inventor: Joseph C. Walsh, Longmont, Colo.

[73] Assignee: Graphic Packaging Corporation, Boulder, Colo.

[21] Appl. No.: 741,349

[22] Filed: Oct. 29, 1996

Related U.S. Application Data

[63] Continuation-in-part of Ser. No. 587,467, Jan. 17, 1996, Pat. No. 5,632,404, and Ser. No. 587,495, Jan. 17, 1996, each is a continuation-in-part of Ser. No.352,526, Dec. 9, 1994, abandoned, and Ser. No. 336,982, Nov. 14, 1994, abandoned, each is a continuation-in-part of Ser. No.51,628, Apr. 22, 1993, abandoned, which is a continuation-in-part of Ser. No. 994,132, Dec. 21, 1992, abandoned.

[51] Int. Cl.⁶ .................................................... B65D 5/56
[52] U.S. Cl. ................... 220/462; 53/491; 220/418; 229/198.2; 493/183
[58] Field of Search ..................... 220/416, 418, 220/462, 460, 461, 463; 229/3.1, 198.2; 493/96, 97, 162, 183; 53/485, 491

[56] References Cited

U.S. PATENT DOCUMENTS

| | | | |
|---|---|---|---|
| 1,845,891 | 2/1932 | Schroeder | 229/198.2 |
| 2,196,243 | 3/1940 | Bensel | 220/418 |
| 2,305,371 | 12/1942 | Yates | 220/418 |
| 2,416,332 | 2/1947 | Lehman | 229/125.32 |
| 2,550,520 | 4/1951 | Bennett | 229/198.2 |
| 2,996,235 | 8/1961 | Turpin | 220/418 |
| 3,194,471 | 7/1965 | Murphy | 220/416 |
| 3,198,416 | 8/1965 | Hickin et al. | 220/418 |
| 3,288,345 | 11/1966 | Dilot | 220/461 |
| 3,640,447 | 2/1972 | Forbes, Jr. et al. | 220/418 |
| 3,910,482 | 10/1975 | Bamburg et al. | 220/418 |
| 3,951,333 | 4/1976 | Forbes, Jr. et al. | 220/418 |
| 4,053,102 | 10/1977 | Stark | 220/418 |
| 4,077,309 | 3/1978 | Marbot | 493/183 |
| 4,139,119 | 2/1979 | McLaren | 220/461 |
| 4,171,064 | 10/1979 | Friess et al. | 220/418 |
| 4,189,986 | 2/1980 | Silver | 493/183 |
| 4,254,173 | 3/1981 | Peer, Jr. | 220/462 |
| 4,471,884 | 9/1984 | Kuchenbecker | 220/462 |
| 4,526,314 | 7/1985 | Reil | 220/462 |
| 4,720,015 | 1/1988 | Brauner | 220/461 |
| 4,768,703 | 9/1988 | Sosler et al. | 220/461 |
| 4,771,938 | 9/1988 | Hambleton | 220/418 |
| 4,927,075 | 5/1990 | Lisiecki | 493/183 |

FOREIGN PATENT DOCUMENTS

| | | | |
|---|---|---|---|
| 239316 | 9/1987 | European Pat. Off. | 229/3.1 |
| 71594 | 5/1957 | France | 53/491 |
| 1516536 | 1/1968 | France | 229/3.1 |
| 208467 | 3/1909 | Germany | 220/460 |
| 451579 | 3/1975 | U.S.S.R. | 53/491 |
| 176994 | 3/1922 | United Kingdom | 220/418 |

*Primary Examiner*—Gary E. Elkins
*Attorney, Agent, or Firm*—Klaas, Law, O'Meara & Malkin, P.C.; Joseph J. Kelly

[57] ABSTRACT

A carton, formed from a unitary sheet of a relatively rigid material having a sheet of a relatively flexible fluid impervious material secured thereto and wherein a top portion of the sheet of a relatively flexible fluid impervious material extends upwardly from a common plane formed below the fold lines of the top panels of the unitary sheet of a relatively rigid material, wherein the top portion of the sheet of a relatively flexible fluid impervious material has facing surfaces adjacent to the top edge thereof that can be folded over two times to form a folded portion lying substantially in a plane parallel to the common plane.

14 Claims, 11 Drawing Sheets

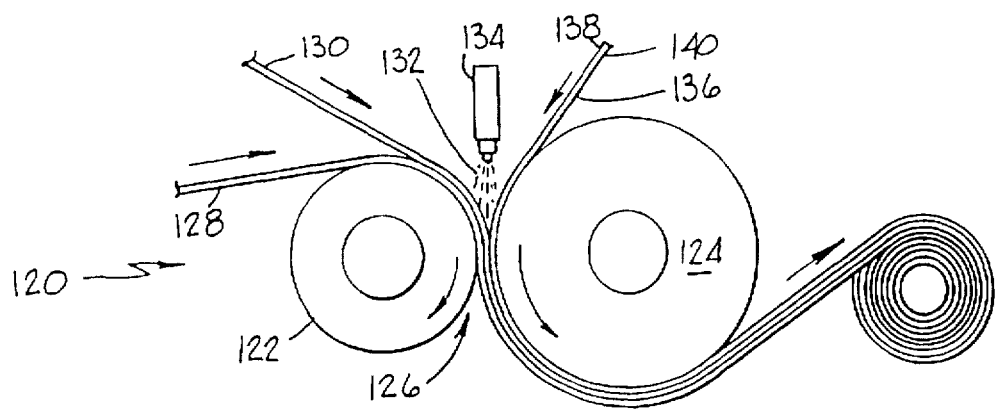
FIG.7
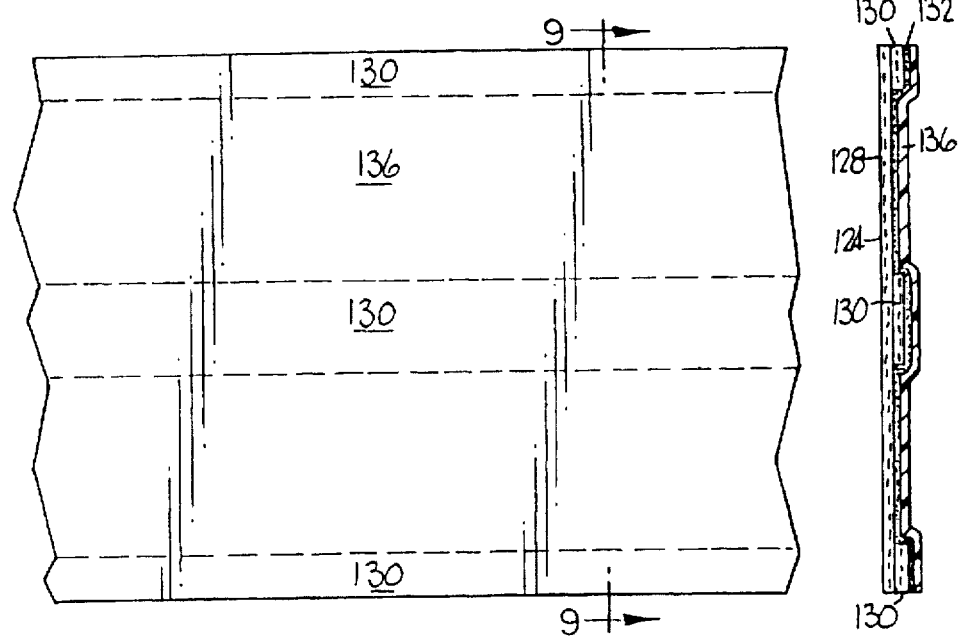
FIG.8
FIG.9
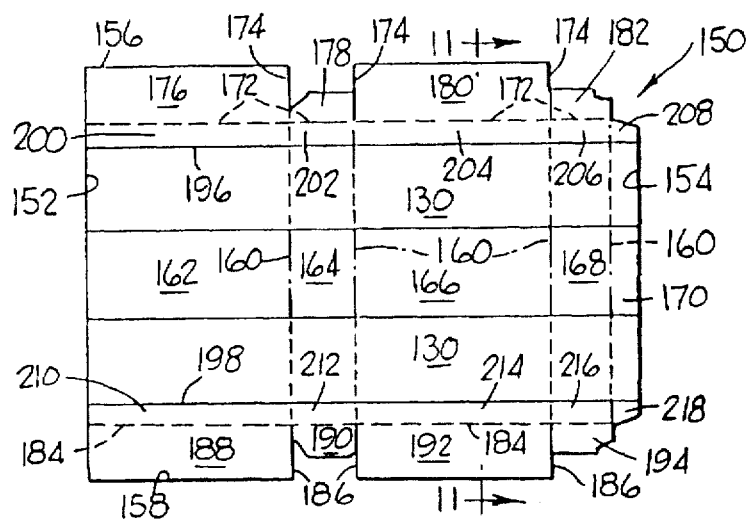
FIG.10
FIG.11

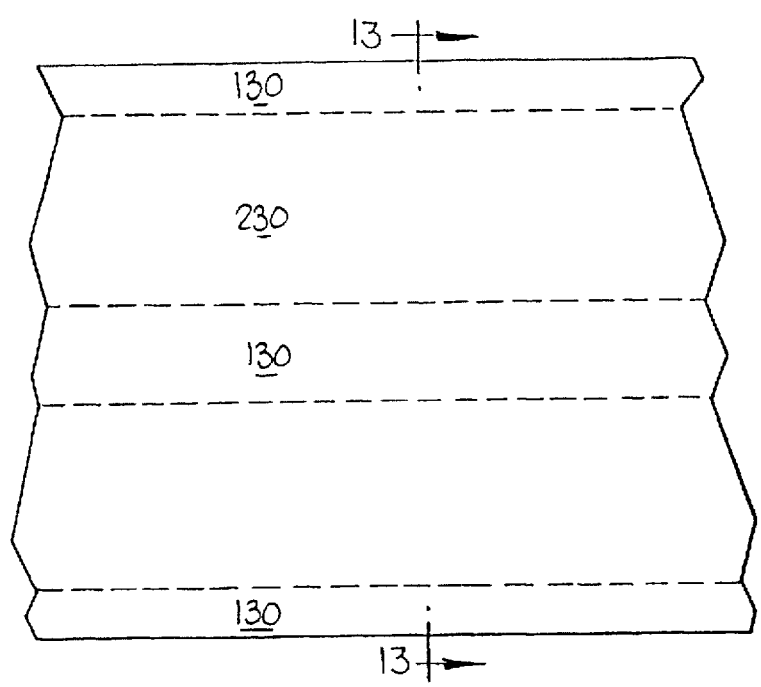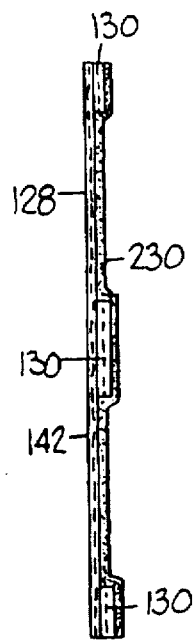
FIG. 12  FIG. 13
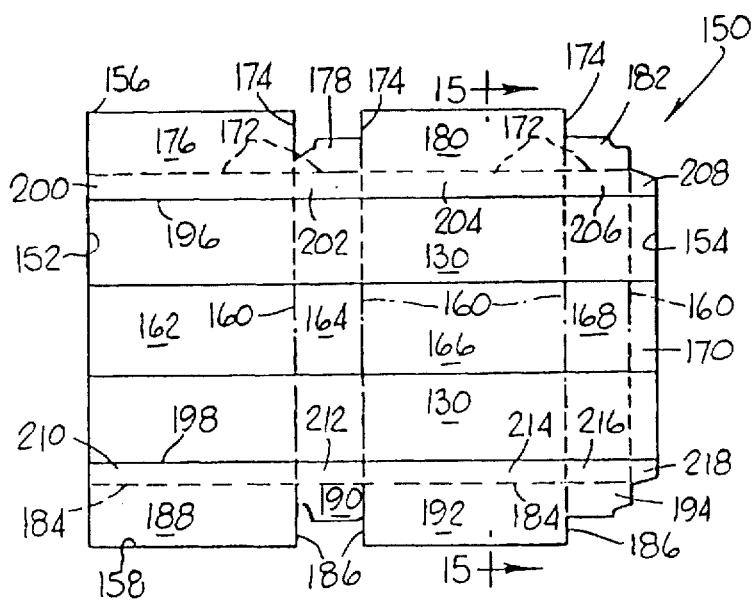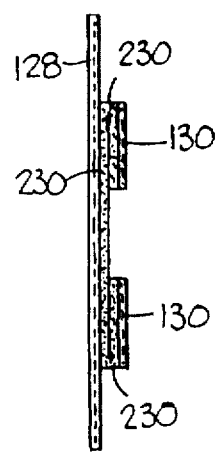
FIG. 14  FIG. 15

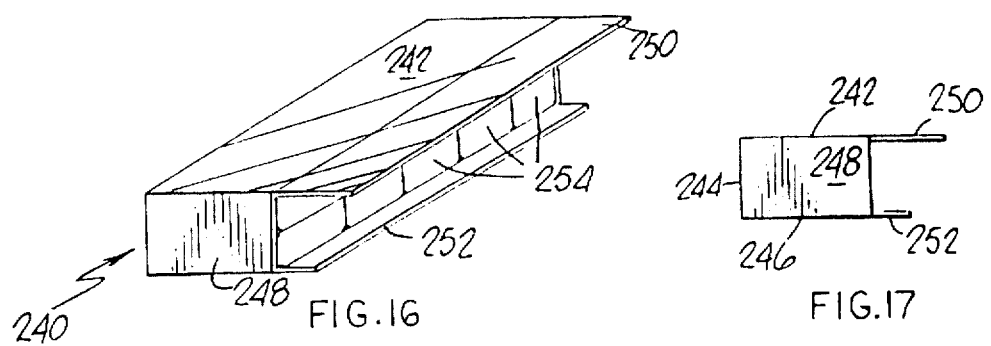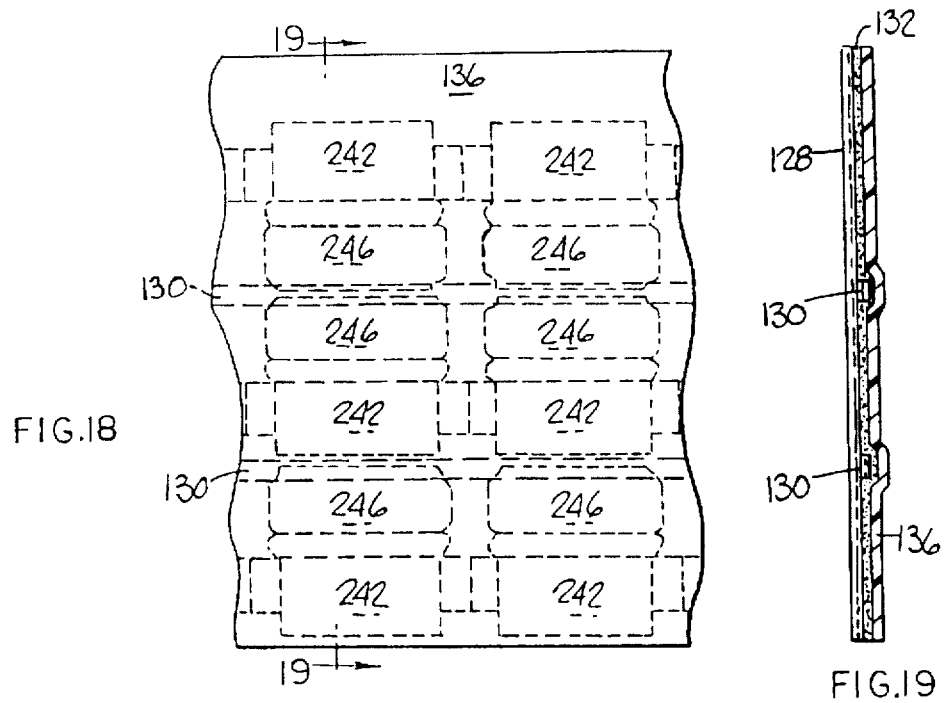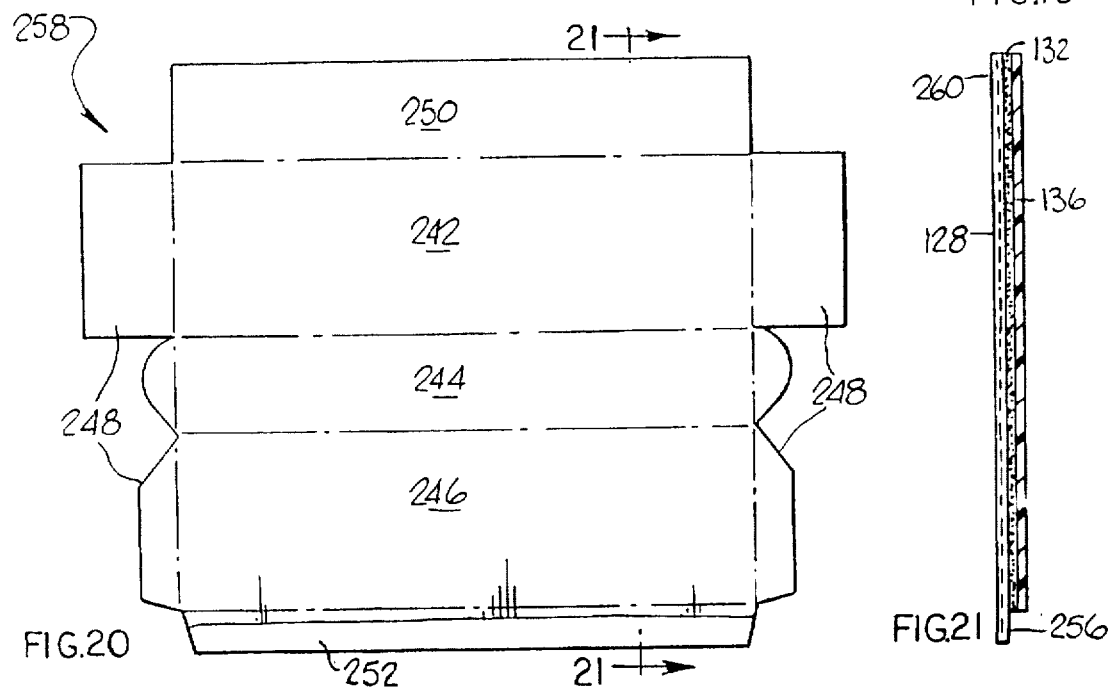

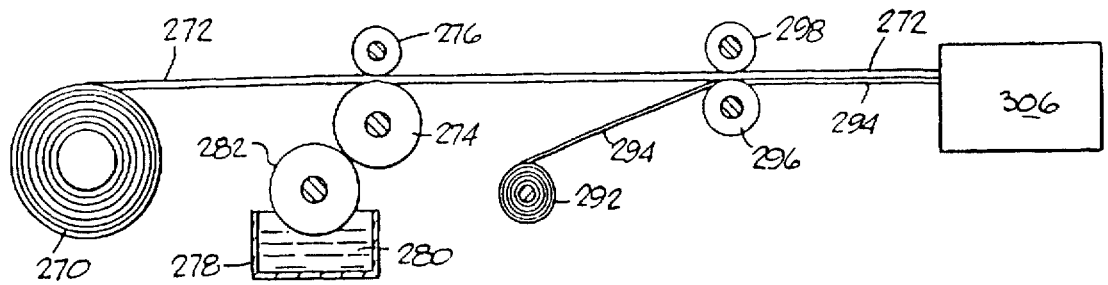
FIG. 22
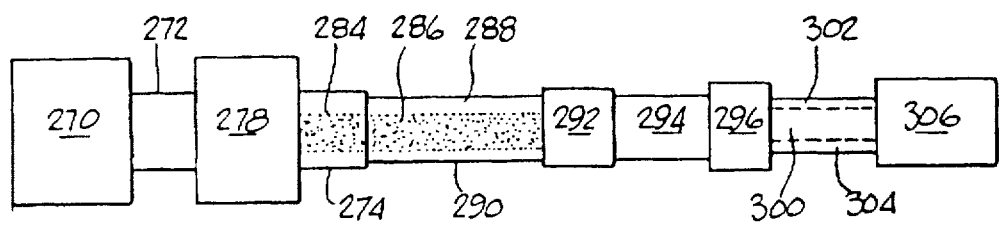
FIG. 23
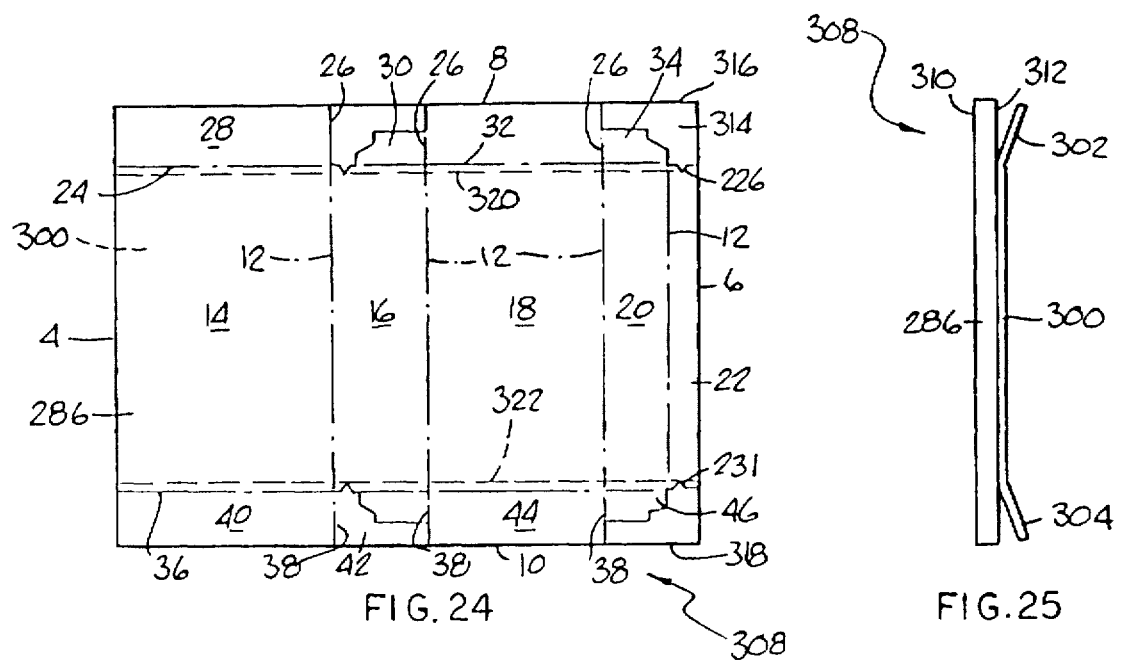
FIG. 24
FIG. 25

CARTON, CARTON BLANK AND METHOD FOR FORMING THE CARTON

This application is a continuation-in-part of U.S. patent applications Ser. No. 08/587,467 filed Jan. 17, 1996, now U.S. Pat. No. 5,632,404 and Ser. No. 08/587,495 filed Jan. 17, 1996, both of which are continuation-in-part applications of U.S. patent application Ser. No. 08/352,526 filed Dec. 9, 1994 (now abandoned) and U.S. patent application Ser. No. 08/336,982 filed Nov. 14, 1994 now abandoned both applications being continuations-in-part of U.S. patent application Ser. No. 08/051,628 filed Apr. 22, 1993 (now abandoned) which application was a continuation-in-part of U.S. patent application Ser. No. 07/994,132 filed Dec. 21, 1992 (now abandoned).

FIELD OF THE INVENTION

This invention is directed generally to carton blanks and apparatus and method for forming the carton blanks and more particularly to apparatus and method for forming carton blanks that can be used to form for leakproof cartons having reclosable inner portions to form an effective seal after the leakproof carton has been opened.

BACKGROUND OF THE INVENTION

There are many supposedly leakproof cartons on the market today. These are formed using a variety of methods. Some of the cartons are designed to hold granular materials while others are designed to hold liquid materials. While some of these leakproof cartons have been successful, there is always a need for improvement including the formation of the top inner portion.

BRIEF DESCRIPTION OF THE INVENTION

This invention provides a leakproof carton wherein a top body portion of a relatively flexible fluid impervious material may be folded, after the carton has been opened, to form an effective seal.

In a preferred embodiment of the invention, the carton blank comprises a unitary sheet of a relatively rigid material having an inner surface and an outer surface a left side edge, a right side edge, a top edge and bottom edge. The unitary sheet of a relatively rigid material is provided width a plurality of cut and fold lines for dividing the unitary sheet of relatively rigid material into a front panel portion, a back panel portion and opposite sidewall panel portion, a glue tab panel portion, and top and bottom panel portions extending outwardly from the front, back and opposite sidewall panel portions. The unitary sheet of a relatively rigid material has a length extending from the top edge to the bottom edge and a width extending in a direction perpendicular to the length. A sheet of a relatively flexible fluid impervious material is provided and has portions thereof superposed over the inner surface of at least the top panel portions and at least portions of the front and back panel portions, the opposite sidewall panel portions and the glue tab panel portion. Securing means extending between the right side edge and the left side edge secure at least a first portion of the sheet of a relatively flexible fluid impervious material to at least portions of the front and back panel portions, the opposite sidewall panel portions and the glue tab panel portion. The sheet of a relatively flexible fluid impervious material has a top edge spaced from and parallel to the top edge of the unitary sheet of a relatively rigid material. The sheet of a relatively flexible fluid impervious material also has a left side edge and a right side edge and a width substantially the same as the width between the left side edge and the right side edge of the unitary sheet of a relatively rigid material. The top edge of the sheet of a relatively flexible fluid impervious material is spaced from the top edge of the unitary sheet of a relatively rigid material a distance at least equal to one-half inch greater than the width of one of the opposite sidewall panel portions. The top panel portions have a least a top front panel portion and a top back panel portion. The top edge of the unitary sheet of a relatively rigid material comprise at least one of the top front and top back panel portions.

In another preferred embodiment of the invention, the carton blank comprises a unitary sheet of a relatively rigid material having an inner surface and an outer surface a left side edge, a right side edge, a top edge and a bottom edge. The unitary sheet of a relatively rigid material has a plurality of cut and fold lines for dividing the unitary sheet of a relatively rigid material into a front panel, a back panel, opposite sidewall panels, a glue tab portion and a plurality of top and bottom panels extending outwardly in opposite directions from the front, back and opposite sidewall panels and joined thereto by fold lines. The inner surface of the front, back and opposite sidewall panels and the glue tab panel has a central body portion, a top body portion and a bottom body portion with the central body portion being located between and spaced from the fold lines between the front, back and opposite sidewall panels and the plurality of top panels and the fold lines between the front, back and opposite sidewall panels and the plurality of bottom panels and extending into the glue tab panel portion. A rectangular sheet of a relatively flexible, fluid impervious material is provided and has a central body portion secured to the central body portion of the inner surface of the front, back and opposite sidewall panels and the glue tab panel. The rectangular sheet of a relatively flexible material has a top body portion and a bottom body portion. At least portions of the top body portion of the rectangular sheet of a relatively flexible fluid impervious material overlie but are not secured to the top body portion of the front, back and opposite sidewall panels and the glue tab panel and at least portion of the bottom body portion of the rectangular sheet of a relatively flexible material fluid impervious overlie but are not secured to the plurality of bottom panels, the bottom body portion of the front, back and opposite sidewall panels and the glue tab panel. The unitary sheet of a relatively rigid material has a length extending from the top edge to the bottom edge and a width extending from the left side edge to the right side edge. The top body portion of the sheet of a relatively flexible fluid impervious material has a top edge spaced from and parallel to the top edge of the unitary sheet of a relatively rigid material. Also, the top body portion of the sheet of a relatively flexible fluid impervious material has a left side edge and a right side edge and a width substantially the same as the width between the left side edge and the right side edge of the unitary sheet of a relatively rigid material. The top edge of the top body portions of the sheet of relatively flexible fluid impervious material is spaced from the fold lines between the front, back and opposite sidewall panels and the top panels a distance at least equal to one-half inch greater than the width of one of the opposite sidewall panels. The rectangular sheet of a relatively flexible fluid impervious material is preferably formed from a plastic material. A carton is formed from one of the above carton blanks by folding and sealing to form an enclosure having a closed bottom end and an open top end and wherein the enclosure is filled with a desired material. The bottom of the top body portion and the top of the central body portion lie in a common plane. The facing portions of the sheet of relatively flexible fluid impervious material adjacent to the top edge thereof are secured together and the remaining portions are folded to form a first folded portion with the top edge thereof substantially in contact with the common plane and folded again to form a second folded portion comprising superposed portions of the first folded portion and lying in a plane substantially parallel to the common plane.

BRIEF DESCRIPTION OF THE DRAWINGS

Illustrative and presently preferred embodiments of the invention are shown in the accompanying drawings in which:

FIG. 7 is a schematic illustration of a laminating process;

FIG. 8 is a top plan view of a portion of a preferred laminate formed using the apparatus of FIG. 7;

FIG. 9 is a cross-sectional view taken on the line 9—9 of FIG. 8;

FIG. 10 is a top plan view of a carton blank formed from the laminate of FIG. 8 as it moves through the formation of the cut and fold lines for the top and bottom panels;

FIG. 11 is a cross-sectional view taken on the line 11—11 of FIG. 10;

FIG. 12 is a top plan view of a portion of another preferred laminate formed using the apparatus of FIG. 7;

FIG. 13 is a cross-sectional view taken on the line 13—13 of FIG. 12;

FIG. 14 is a top plan view of a carton blank formed from the laminate of FIG. 12 as it moves through the formation of the cut and fold lines for the top and bottom panels;

FIG. 15 is a cross-sectional view taken on the line 15—15 of FIG. 14;

FIG. 16 is a perspective view of another carton of this invention;

FIG. 17 is an end elevational view of FIG. 16;

FIG. 18 is a top plan view of a portion of another preferred laminate being formed with the carton blanks to be formed therefrom illustrated in dashed lines;

FIG. 19 is a cross-sectional view taken on the line 19—19 of FIG. 18;

FIG. 20 is a top plan view of one of the carton blanks illustrated in FIG. 18;

FIG. 21 is a cross-sectional view taken on the line 21—21 of FIG. 20;

FIG. 22 is a schematic illustration of apparatus forming another preferred embodiment of the invention;

FIG. 23 is a bottom plan view of FIG. 22;

FIG. 24 is a top plan view of a carton blank of another preferred embodiment of the invention;

FIG. 25 is an end elevational view taken from the right side of FIG. 24;

DETAILED DESCRIPTION OF THE INVENTION

Figure 1:
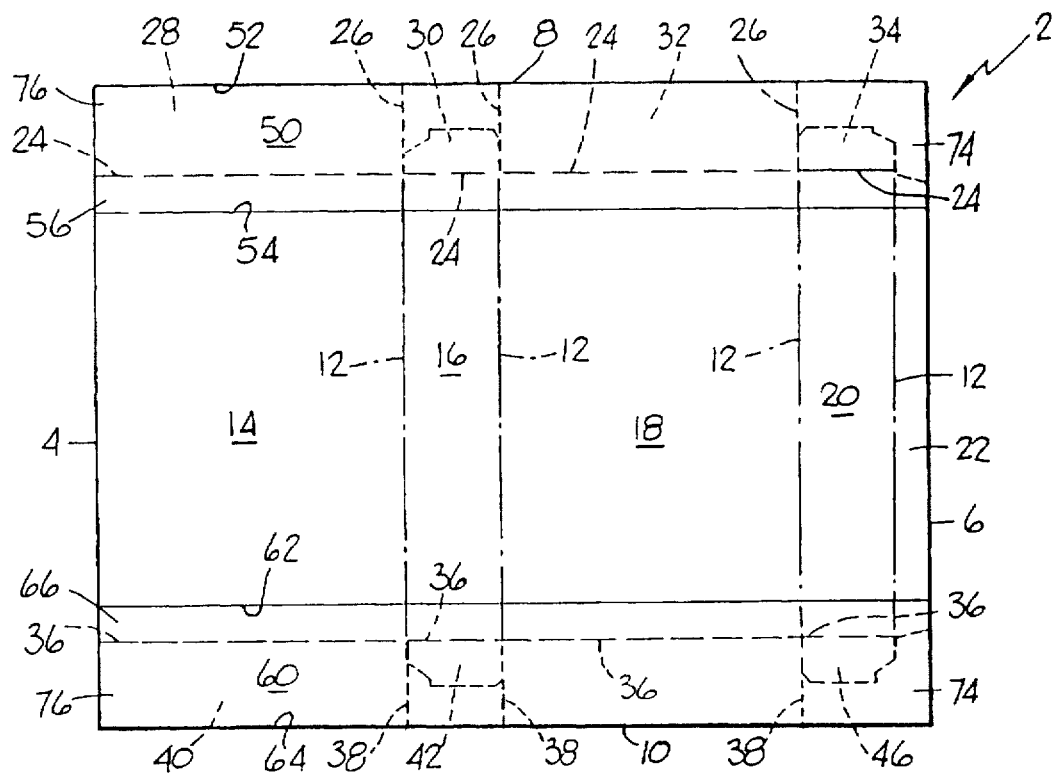
FIG. 1 is a top plan view of the inside portion of a carton blank of a preferred embodiment of the invention.
Figure 5:
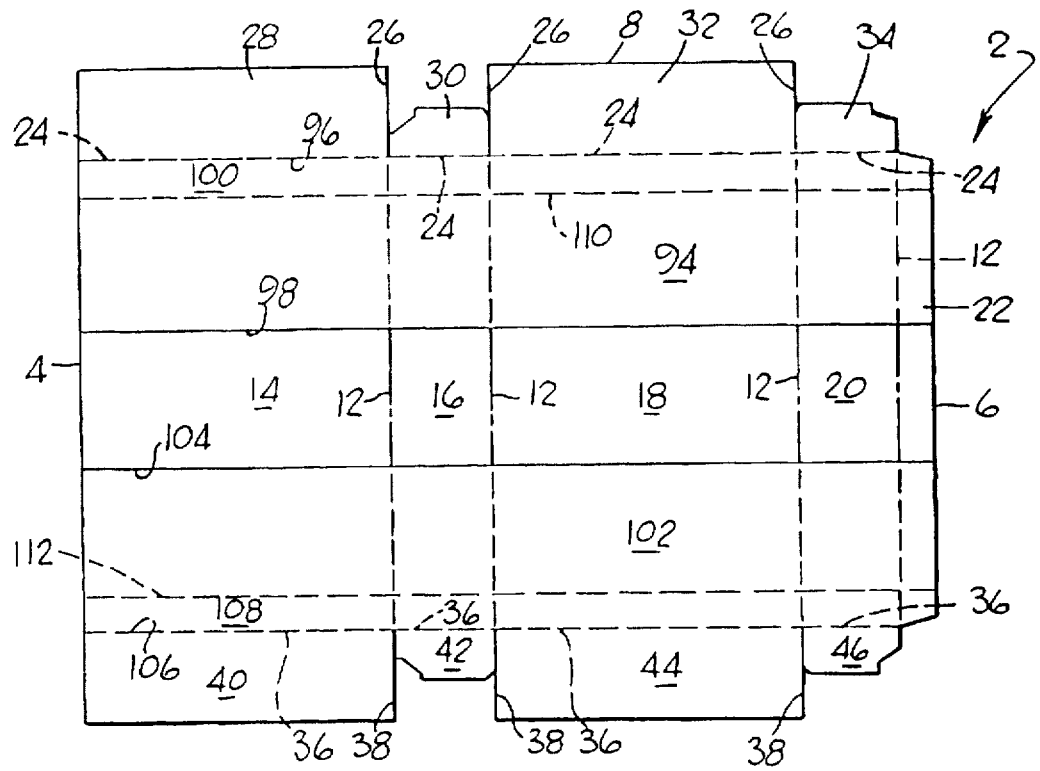
FIG. 5 is a top plan view of a carton blank of another preferred embodiment of the invention.
Figure 6:
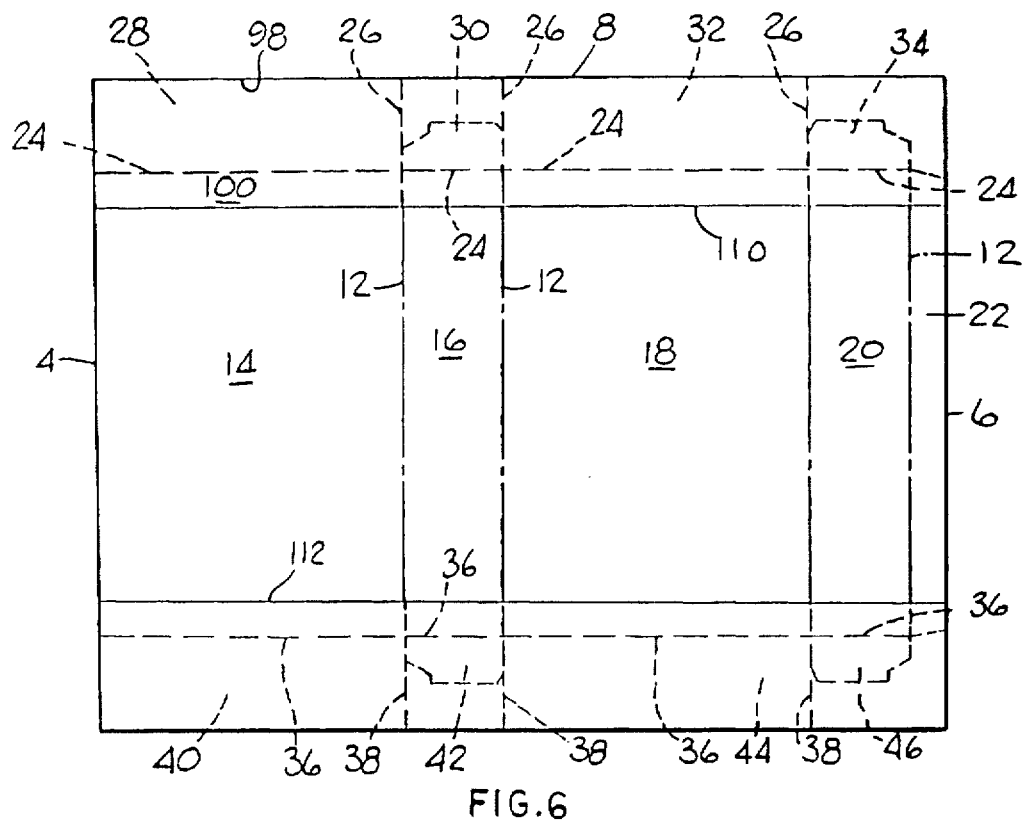
FIG. 6 is a top plan view of the carton blank of FIG. 5 after initial operations have been performed thereon.

In FIG. 1, there is illustrated the inner surface of a carton blank 2 of one preferred embodiment of the invention. The carton blank 2 has a left side edge 4, a right side edge 6, a top edge 8 and a bottom edge 10 with the left side and right side edges 4 and 6 being perpendicular to the top and bottom edges 8 and 10. A plurality of fold lines 12 divide the carton blank 2 into a back panel portion 14, a right side panel portion 16, a front panel portion 18, a left side panel portion 20 and a glue tab panel portion 22. A plurality of fold lines 24 and a plurality of cut lines 26 divide carton blank 2 into a top back panel portion 28, top right side panel portion 30, top front panel portion 32, and top left side panel portion 34. A plurality of fold lines 36 and cut lines 38 divide the carton blank 2 into bottom back panel portion 40, bottom right side panel portion 42, bottom front panel portion 44 and bottom left side panel portion 46. It is understood that the carton blank illustrated in FIGS. 1, 5 and 6 is for illustration purposes only and that this invention can be used with carton blanks of a variety of configurations.

A first sheet 50 of a relatively flexible fluid impervious material having an upper edge 52 and a lower edge 54 overlies the top back 28, top right side 30, top front 32 and top left side 34 panels portions and portions of the back 14, right side 16, front 18, left side 20 and glue tab 22 panels portions. A portion 56 of the first sheet 50 of a relatively flexible material between the fold lines 24 and the lower edge 54 and spaced a slight distance from the fold lines 24 is secured to the underlying portions of the back 14, right side 16, front 18, left side 20 and glue tab 22 panels portions so as to form a continuous seal extending from the left side edge 4 to the right side edge 6.

A second sheet 60 of a relatively flexible fluid impervious material having an upper edge 62 and a lower edge 64 overlies the bottom back 40, bottom right side 42, bottom front 44 and bottom left side 46 panels portions and portions of the back 14, right side 16, front 18, left side 20 and glue tab 22 panels portions. A portion 66 of the second sheet of a relatively flexible material between the fold lines 36 and the upper edge 62 and spaced a slight distance from the fold lines 36 is secured to the underlying portions of the back 14, right side 16, front 18, left side 20 and glue tab 22 panels portions so as to form a continuous seal extending from the left side edge 4 to the right side edge 6.

The first 50 and second 60 sheets of a relatively flexible material are preferably formed from a fluid impervious material, such as a paper material coated with a plastic material such as polyethylene such as that marketed by Eastman Kodak under the trade designation 808 P having a thickness between about 0.75 and 1.0 mils or other types of material having similar characteristics. The first 50 and second 60 sheets can be formed from a plastic material, such as polypropylene, or other materials having similar characteristics. The portions 56 and 66 are secured using adhesive or welding or other conventional sealing practices. The carton blank preferably comprises a unitary sheet of a composite laminate of layers of materials. The inside layer preferably comprises a paperboard material such as 0.021 inch DKL (recycled) or other similar materials such as natural Kraft board. The outside layer preferably comprises 0.75 mil polypropylene or other similar materials such as low density polyethylene which may be back printed to provide a desired appearance. Other thicknesses of the paperboard and plastic materials may be used. The method of forming the unitary sheet for forming the carton blank 2 is described in U.S. Pat. No. 4,254,173 to Peer, Jr., which is hereby incorporated herein by reference thereto. If the carton is to be used for holding liquids the inside surface is coated with a suitable material such a polyethylene or other materials having similar characteristics. Also, a portion or the glue tab panel portion 22 is skived and hemmed in a conventional manner with the polyethylene layer being folded over the exposed edge of the paperboard material.

Figure 2:
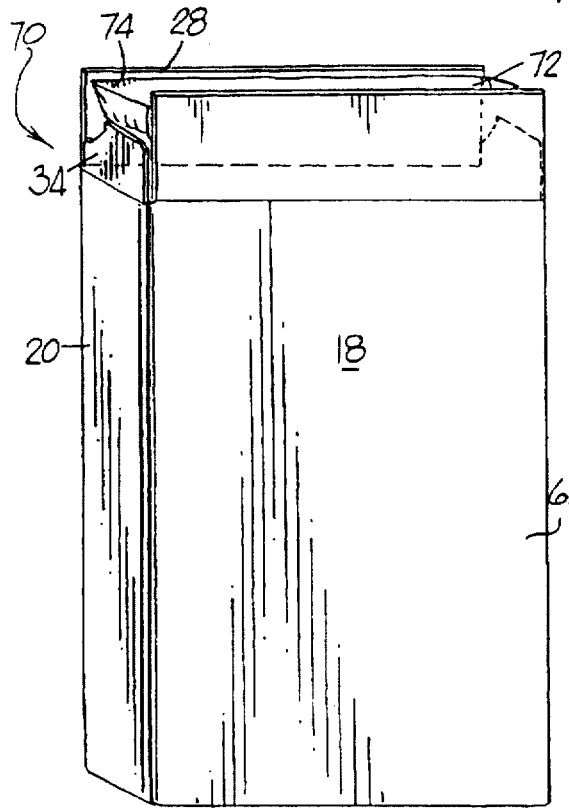
FIG. 2 is a perspective view of the carton blank of FIG. 1 slightly enlarged and folded so that desired materials may be placed therein.

In FIG. 2, there is illustrated the outer surface 68 of a partially formed carton 70 from the carton blank 2 and has an open top end 72 so that it is ready for filling. The carton 70 is formed by folding the glue tab panel portion 22 around a fold line 12, then the left side panel portion 20 is folded around a fold line 12, the front panel portion is folded around a fold line 12, and then the right side panel portion 16 is folded around a fold line 12 until the glue tab panel portion 22 overlies a portion of the back panel portion 14. The glue tab panel portion 22 is then secured to the portion of the back panel portion 14 using any conventional sealing practice. At the same time, the portions 74 of the first 50 and second 60 sheets of relatively flexible material are secured to the portions 76 thereof. The second sheet 60 of relatively flexible material is then secured together in a conventional manner as described below. The bottom back panel portion 40 is folded around a fold line 36, the bottom left side 46 and bottom right side 42 panels portions are folded around fold lines 36 so that they are in superposed relationship to portions of the bottom panel portion 40 and the bottom front panel portion 44 is folded around a fold line 36 to a superposed relationship. The bottom panels portions 40, 42, 46 and 44 are then secured together using any conventional sealing practice.

Figure 3:
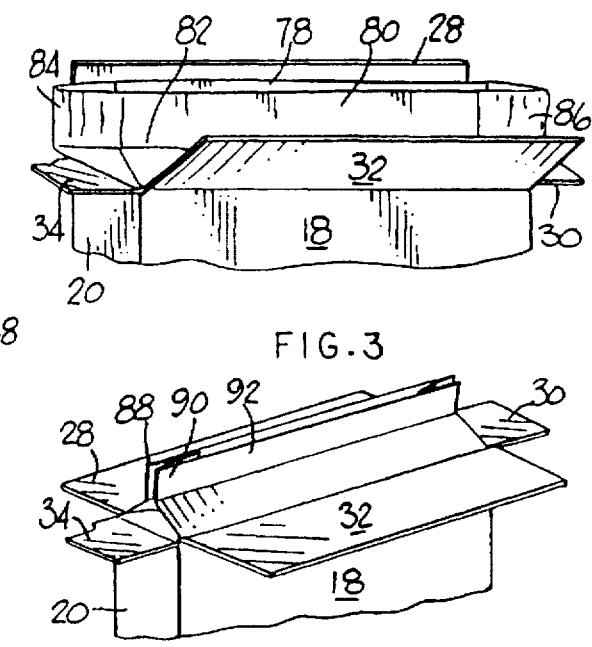
FIG. 3 is a perspective view of one closure for a sheet of relatively flexible material.
Figure 4:
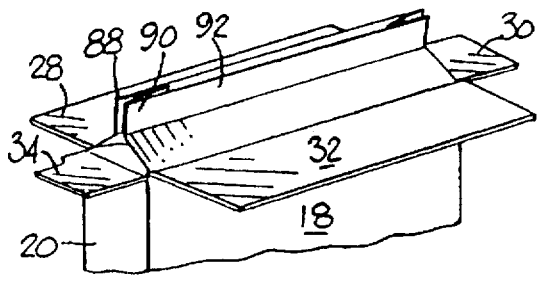
FIG. 4 is a perspective view of another closure for the sheet of relatively flexible material.

After the carton 70 has been filled, the carton is closed and sealed using conventional practices such as those illustrated in FIGS. 3 and 4. In FIG. 3, the portions 78 and 80 are secured together, then folded over the line 82. The end flaps 84 and 86 are then folded over to form a leakproof carton. The top panel portions 28, 30 and 32 and 34 are then folded and secured together in the same manner as that described above in relation to the bottom panels portions 40, 42 44 and 46.

In FIG. 4, a gable joint is used to seal the exposed portions of the first sheet 50 of the relatively flexible material. The portion of the first sheet 50 of a relatively flexible material above the left side panel portion is folded inwardly and secured together to form two end portions 88 and 90. The other end is formed in the same manner. The central portions 92 are secured together and they included the innermost portions of the end portions 88 and 90 to form a leakproof carton.

In FIGS. 5 and 6, there is illustrated another preferred embodiment of the invention. Since the carton 2 remains the same, it will be identified with the same reference numerals and the description remains the same.

A first sheet 94 of a relatively flexible fluid impervious material having an upper edge 96 and a lower edge 98 overlies portions of the back panel portion 14, right side panel portion 16, front panel portion 18, left side panel portion 20 and glue tab panel portion 22. A section 100 of the first sheet 94 of a relatively flexible material is secure to these panels portions at locations spaced a slight distance from the fold lines 24 by any conventional practice to form a continuous seal extending between the right side edge 4 to the left side edge 6.

A second sheet 102 of a relatively flexible fluid impervious material having an upper edge 104 and a lower edge 106 overlies other portions of the back panel portion 14, right side panel portion 16, front panel portion 18, left side panel portion 20 and glue tab panel portion 22. A section 108 of the first sheet 94 of a relatively flexible material is secured to these panels portions at locations spaced a slight distance from the fold lines 36 by any conventional practice to form a continuous seal extending between the right side edge 4 to the left side edge 6.

The first step in forming a carton from the carton blank 2 of FIG. 5 is illustrated in FIG. 6. The lower edge 98 of the first sheet 94 of a relatively flexible material is moved toward the top edge 8 until it is contiguous to the top edge 8 and portions of the first sheet 94 of a relatively flexible material overlie the section 100 and the top back panel portion 28, the top right side panel portion 30, the top front panel portion 32 and the top left side panel portion 34 and is creased along the line 110 to hold it in place. The upper edge 104 of the second sheet 102 of a relatively flexible material is moved toward the bottom edge 10 until it is contiguous to the bottom edge 10 and portions of the second sheet 102 of a relatively flexible material overlie the section 108 and the bottom back panel portion 40, the bottom right side panel portion 42, the bottom front panel portion 44 and the bottom left side panel portion 46 and is creased along the line 112 to hold it in place. A carton 70 is formed, filled and sealed as described above in relation to FIGS. 1–4.

In FIG. 7, there is illustrated conventional laminating apparatus 120 used for forming the laminated products of this invention. The laminating apparatus comprises a pair of rotating rolls 122 and 124 having a nip portion 126. A continuous strip 128 of a relatively rigid material, such as a paperboard described in U.S. Pat. No. 4,254,173 dated Mar. 31, 1981 and issued to Peer, Jr., which is incorporated herein by reference thereto, or a conventional clay coated paperboard having surface printing thereon is pulled from a roll (not shown) of such material and fed into the nip portion. At the same time, a plurality of relatively narrow continuous strips 130 of a relatively flexible material, such as a kraft paper, in spaced apart relationship, are pulled from rolls (now shown) of such material and fed into the nip portion 126 to be in spaced apart superposed relationship on the continuous strip 128. A liquid plastic material 132, such as polyethylene or other materials having similar characteristics, or a conventional adhesive material is sprayed into the nip portion 126 by a nozzle 134. A continuous film 136 of a relatively flexible fluid impervious plastic material, such as polypropylene or other materials having similar characteristics, having oppositely facing surfaces 138 and 140 is pulled from a roll (not shown) of such material and fed into the nip portion 126 so that the surface 138 moves into contact with the liquid plastic material 132. As the laminate passes through the nip portion 126, the surface 138 is secured to the coated portions of the continuous strips 130 of a relatively flexible material and the coated portion of the continuous strip 128 of a relatively rigid material. The middle continuous strip 130 has a width twice the width of the end continuous strips 130 so that when forming the carton blanks, described below, the middle continuous strip will be cut in half. After the formation of the laminate described above, the laminate is cut in half along the middle strip 130. Then, the end continuous strips 130 and the portions of the continuous film 136 of a relatively flexible plastic material are folded back upon themselves, as illustrated in FIGS. 10 and 11 and passed through a conventional apparatus for forming cut lines and fold lines to produce a carton blank illustrated in FIG. 10.

The carton blank 150 has a left side edge 152, a right side edge 154, a top edge 156 and a bottom edge 158 with the left side and right side edges 152 and 154 being perpendicular to the top and bottom edges 156 and 158. A plurality of fold lines 160 divide the carton blank 150 into a back panel portion 162, a left side panel portion 164, a front panel portion 166, a right side panel porion 168 and a glue tab panel portion 170. A plurality of fold lines 172 and a plurality of cut lines 174 divide the carton blank 150 into a top back panel portion 176, top left side panel portion 178, top front panel portion 180, and top right side panel portion 182. A plurality of fold lines 184 and cut lines 186 divide the carton blank 150 into bottom back panel portion 188, bottom left side panel porion 190, bottom front panel portion 192 and bottom right side panel portion 194. It is understood that the carton blank illustrated in FIGS. 10 and 11 is for illustration purposed only and that this invention can be used with carton blanks of a variety of configurations.

The upper continuous strip 130 of FIG. 8 is folded over the fold line 196 and the half of the middle continuous strip 130 has been folded over the fold line 198. After the continuous strips 130 together with the portions of the film 136 secured thereto have been folded over, the laminate is passed through a conventional machine to form the cut and fold lines described above. Prior to forming a carton from the carton blank 150, the upper continuous strips 130 is folded back to overlie the top panel portions 176, 178, 180 and 182 and the portions 200, 202, 204 and 206 of the sidewall panel portions 162, 164, 166 and 168 and the portion 208 of the glue panel portion 170 and the lower continuous strip 130 is folded back to overlie the bottom panel portions 188, 190, 192 and 194 and the portions 210, 212, 214 and 216 of the sidewall panel portions 162, 164, 166 and 168 and the portion 218 of the glue panel portion 170. A carton is then formed and filled as described above in relation to FIGS. 3 and 4. The inner surface of the carton will be the film 136 of the relatively flexible plastic material to form a leakproof carton.

The laminate illustrated in FIGS. 12 and 13 is formed using the apparatus of FIG. 7 but does not include the continuous film 136 of a relatively flexible plastic material. A continuous strip 128 of a relatively rigid material, such as paperboard of the type in the Peer, Jr. patent or a conventional clay-coated paperboard, is fed into the nip 126 along with the plurality of continuous strips 130 of a relatively flexible material, such as paper, and a liquid plastic material, such as polyethylene, is fed into the nip 126 and as these materials pass through the nip 126 a continuous coating 230 of the fluid impervious plastic material is formed over the exposed surfaces of the continuous strip 128 and the continuous strips 130. Also, the laminate is cut in half along the middle continuous strip 130 and the continuous strips 130 are folded back as illustrated in FIGS. 14 and 15 so that the cut and fold lines may be made. The continuous strips 130 are folded back, as described above, so that the cartons when formed as in FIGS. 3 and 4 will have a continuous inner surface of a plastic coating 230. In some instances, it may be desirable to use a bead of adhesive to secure an edge portion of each continuous strip 130 to a portion of the continuous strip 128. This can be done when the continuous strips 130 are being superposed over portions of the continuous strip 128 prior to entering the nip 126.

In FIGS. 16 and 17, there is illustrated a carton 240 having a plurality of sidewall panels 242, 244 and 246 and sealed together end panels 248. As illustrated in FIGS. 16 and 17, the closure panel 250 and the glue tab panel 252 are in an opened condition so that packages 254 of cigarettes may be inserted therein. At the manufacture's plant for making cigarettes, after the packages 254 have been inserted, the closure panel 250 is temporarily sealed to the glue tab panel 252 and loaded into large boxes for shipment to distributing centers. During shipment the seal between the closure panel and the glue tab panel 252 breaks. This is done because at the distributing centers, it is necessary to apply the state and/or local tax stamps. After the tax stamps have been applied, the closure panel 250 is then permanently sealed to the glue tab panel 252. Since there are so many distributing centers, it is common for them to use conventional apparatus to apply a water base adhesive to secure the closure panel 250 to the glue tab panel 252. When a carton is formed from a composite material such as in the Peer, Jr. patent, glue tab panel 252 has a plastic surface facing the paperboard surface of the closure panel 250. Therefore, since a water based adhesive is not compatible to the plastic surface, a permanent seal cannot be made. Other surface materials may also result in non-compatible surfaces.

In FIGS. 18 and 19, there is illustrated a laminate from which a carton blank can be formed to have a desired reverse printed plastic film as an outer surface and still have compatible paperboard to paperboard surfaces on the closure panel 250 and the glue tab panel 252. The laminate of FIGS. 18 and 19 is formed using the apparatus in FIG. 7. A continuous strip 128 of a relatively rigid material, such as paperboard is fed into the nip 126, and two continuous strips 130 of a relatively flexible material, such as paper, are superposed over portions of the continuous strip 128 so that the liquid plastic material 132 contacts only the exposed surfaces of the continuous strip 128 and the continuous strips 130. A reverse printed plastic film, such as that illustrated in FIG. 7 as 136, is fed into the nip 126 from the other side so that it can be coated by the liquid plastic material 132. After this, the laminate is passed through apparatus, such as a vacuum roll, where the continuous strips 130 with the portion of the plastic film 136 adhered thereto are pulled away from the laminate to leave a portion 256 of the continuous strip 128 exposed. The lower continuous strip 130 has a width that is one-half the width of the upper continuous strip 130. When the carton blank 258 of FIGS. 20 and 21 is folded around the fold lines, the exposed paperboard portion 256 will face the paperboard portion of the closure panel 250 so that a water based adhesive may be used to form a permanent seal between these compatible surfaces. The carton blanks 258 are illustrated in FIG. 18 only to show that the glue tab panel portion 252 extend in the machine direction.

The thickness of the various materials such as the continuous strip 128, the plastic adhesive or coating 132 or 230, the continuous strip 130 and the plastic film have been exaggerated for illustration purposes. The continuous strip 128, the plastic adhesive or coating 132 or 230 and the plastic film would be similar to the corresponding materials in the Peer, Jr. patent. The continuous strips 130 may comprise a kraft paper having a thickness of between about 0.75 and 1.0 mils of other types of materials having similar characteristics.

Another preferred embodiment of the invention is schematically illustrated in FIGS. 22 and 23. A roll 270 of a relatively rigid material, such as that described above, is mounted so that a continuous strip 272 may be removed therefrom. The continuous strip 272 is fed between a driven gravure roll 274 and an idler pressure applying roll 276. A supply tank 278 is mounted at a fixed location and holds a supply of a suitable adhesive material 280. A transfer roll 282 is rotatably mounted to pass through the adhesive material 280 and then to contact the raised surface 284 of the gravure roll 274 to coat the raised surface 284 with the adhesive material 280 and the gravure roll 274 then coats the central body portion 286 of the continuous strip 272 with the adhesive material 280 leaving opposite edge portions 288 and 290 uncoated. Although a gravure roll is preferred, it is understood that other types of rolls or other types of conventional laminating apparatus can be used to apply the adhesive material to the continuous strip 272.

A roll 292 of a relatively flexible fluid impervious material is mounted so that a continuous film 294 may be removed therefrom. The roll 292 of a relatively flexible fluid impervious material can comprise a plastic coated paper material, such as that described above, but preferably comprises a laminated material, such as a kraft paper and a film of polypropylene or other materials having similar characteristics laminated thereto or a film of a fluid impervious plastic material. The continuous strip 272 and the continuous film 294 are moved into conventional laminating apparatus having a first roll 296 and a second roll 298 to secure the central body portion 300 of the continuous film 294 to the central body portion 286 of the continuous strip 272 leaving opposite edge portions 302 and 304 unsecured. Either one or both of the first 296 and second 298 rolls may be driven by conventional means (not shown). Also, either one or both of the first 296 and second 298 rolls can have an elastic surface. The continuous strip 272 and the continuous film 294 are then passed through conventional apparatus 306 to provide the continuous strip 272 with cut and fold lines. In FIGS. 22 and 23, the continuous strip 272 is illustrated as being of a width so that only one coating of adhesive is applied thereto. However, it is understood that the continuous strip 272 can have a width so that a plurality of spaced apart adhesive coatings may be applied to the continuous strip 272 so that a continuous film 294 having the same width can also be secured thereto.

In FIGS. 24 and 25, there is illustrated a carton blank 308 formed by the process illustrated in FIGS. 22 and 23. The carton blank 308 has an outer surface 310 and an inner surface 312. The carton blank 308 is similar to the carton blank 2 of FIGS. 1 and 5 and corresponding parts have been identified with the corresponding reference numerals. The central body portion 300 of a rectangularly shaped sheet 314 of the flexible plastic film 294 is adhesively secured to the central body portion 286 of the relatively rigid paperboard material so that the opposite edge portions 302 and 304 are unsecured. As illustrated, portions of the edges of the rectangularly shaped sheet 314 underlie the edges 4, 6, 8 and 10.

As illustrated in FIG. 24, the central body portions 286 and 300 are secured together between the lines 320 and 322. A cut-out 226 is formed in the upper portion of the glue tab panel portion 22 and extends downwardly to the line 320. Also, a cut-out 231 is formed in the lower portion of the glue tab panel portion 22 and extends upwardly to the line 322. Although the cut-outs 226 and 231 are illustrated as v-shaped, it is understood that they can be of other geometrical configurations. Also, although the cut-outs 226 and 231 are illustrated as extending completely through the glue tab panel portion 22, it is understood that they can extend only partially through the glue tab panel portion 22. When a carton is formed from the carton blank 308 by folding around the fold line 12, a continuous bead of adhesive (not shown) is superposed over the upper portion of the rectangularly shaped sheet 314, the cut-out 226, the glue tab panel portion 22, the cut-out 231 and the lower portion of the rectangularly shaped sheet 314. A carton is formed from the carton blank 308 by conventionally forming the edge portion 304, folding and securing the bottom panel portions 40, 42, 44 and 46, filling the carton, conventionally folding the edge portion 302 and folding and securing the top panel portions 28, 30, 32 and 34.

Figure 26:
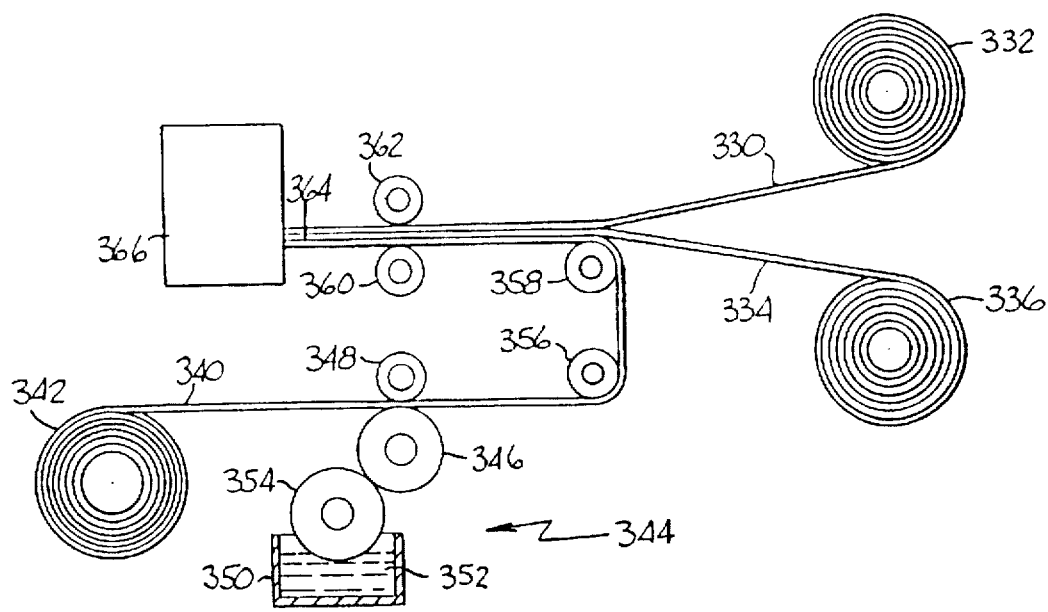
FIG. 26 is a schematic illustration of apparatus forming another preferred embodiment of the invention.

Another preferred embodiment of the invention is schematically illustrated in FIG. 26. A continuous strip 330 of a relatively rigid material, such as paperboard, is pulled from the roll 332. A plurality of spaced apart, relatively narrow continuous strips 334 of a relatively flexible material, similar to the strips 130, are pulled from the rolls 336 and are positioned at spaced apart locations beneath the continuous strip 330 for movement therewith.

A continuous film 340 of a relatively flexible fluid impervious material, such as those described above, is pulled from the roll 342 and fed into an adhesive coating station 344. The continuous film 340 moves between a driven gravure roll 346 having at least one raised surface and an idler pressure applying roll 348. A supply tank 350 is mounted at a fixed location and holds a supply of a suitable adhesive material 352. A transfer roll 354 is rotatably mounted to pass through the adhesive material 352 and then to contact the raised surfaces of the gravure roll 346 to coat them with the adhesive material 352. The coated continuous film 340 passes over guide rollers 356 and 358. The coated continuous film 340, the strips 334 and the continuous strip 330 pass into conventional laminating apparatus having a first roll 360 and a second roll 362, similar to the first 296 and second 298 rolls, to secure the strips 334 to the coated continuous film 340 and the portions of the continuous strip 330 of a relatively rigid material between the strips 334 to the continuous film 340. The laminated product 364 is then fed into conventional apparatus 366 for further processing. Although a gravure roll is preferred, it is understood that other types of rolls can be used to apply the adhesive material to the continuous film 340.

Figure 27:
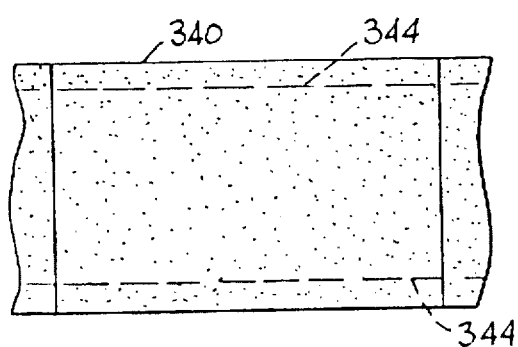
FIGS. 27–29 illustrate various types of adhesive patterns.
Figure 28:
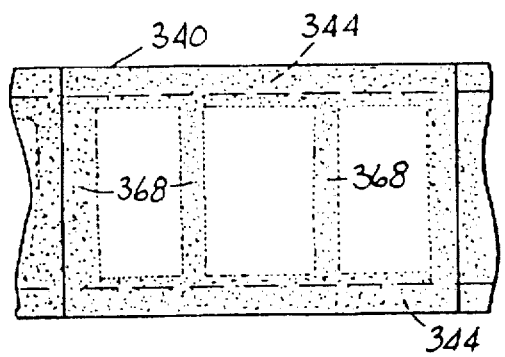
Figure 29:
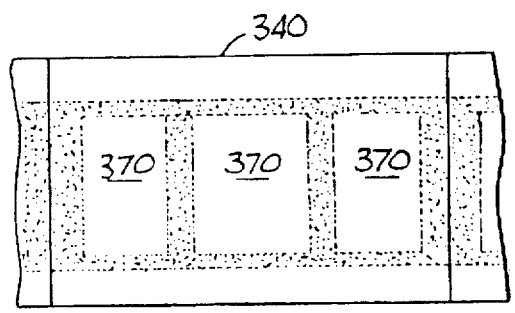

If the gravure roll 346 applies a continuous film of the adhesive material 352 as illustrated in FIG. 27, then the plurality of strips 334 and the portions of the continuous strip 330 between the plurality of strips 334 will be adhered to the continuous film 340. If desired, the gravure roll 346 can apply an adhesive pattern as illustrated in FIG. 28 so that the continuous strip 330 is adhered to the continuous film 340 at spaced apart intervals 368. The gravure roll 346 can apply a pattern of adhesive to the continuous film 340 similar to the pattern illustrated in FIG. 23 to secure the central body portion of the continuous film 340 to the central body portion of the continuous strip 330 or, as a modification illustrated in FIG. 29, the pattern will contain non-adhesive areas 370.

Figure 30:
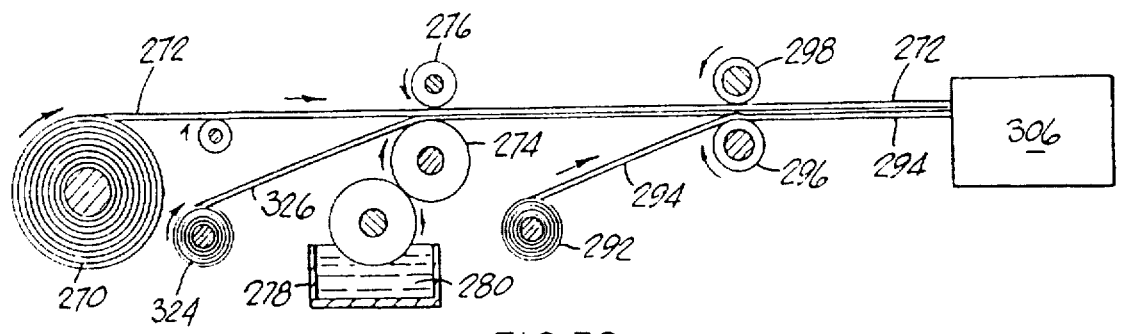
FIG. 30 is similar to FIG. 22 but includes the feeding of a plurality of spaced apart, relatively narrow continuous strips of a relatively flexible material.

The apparatus illustrated in FIG. 30 is similar to the apparatus illustrated in FIG. 22 except that a plurality of spaced apart rolls 324 of a relatively flexible material, such as kraft paper, are located so that spaced apart, relatively narrow continuous strips 326 may be fed into the nip between the gravure roll 274 and the idler roll 276. The gravure roll 274 has a surface pattern to apply an adhesive coating material similar to that illustrated in FIGS. 27 or 28.

Figure 31:
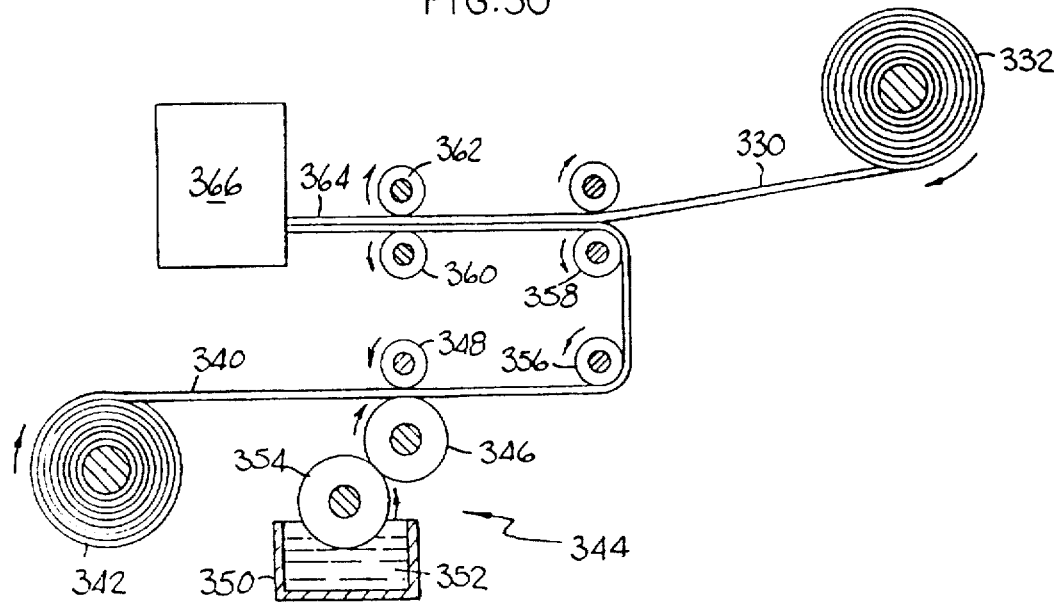
FIG. 31 is similar to FIG. 26 but does not include the feeding of a plurality of spaced apart continuous strips of a relatively flexible material.

The apparatus illustrated in FIG. 31 is similar to the apparatus illustrated in FIG. 26 except that the spaced apart, relatively narrow continuous strips 334 of a relatively flexible material have been excluded. The gravure roll 346 has a surface pattern to apply an adhesive coating material similar to that illustrated in FIGS. 23 or 29 to produce a product illustrated in FIG. 25.

Figure 32:
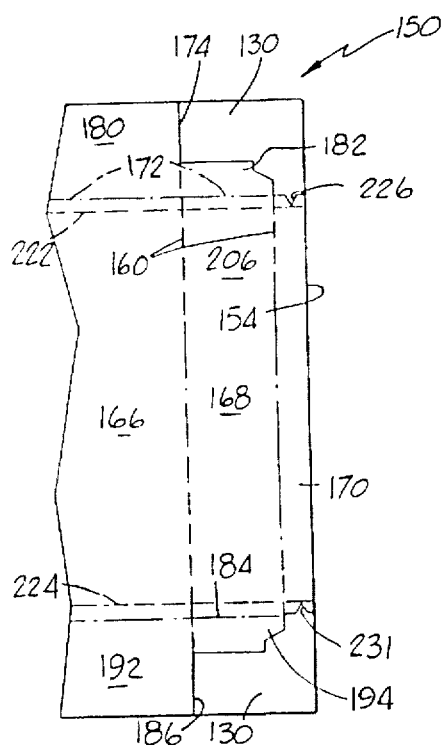
FIG. 32 is a partial top plan view of another preferred embodiment of the invention.
Figure 33:
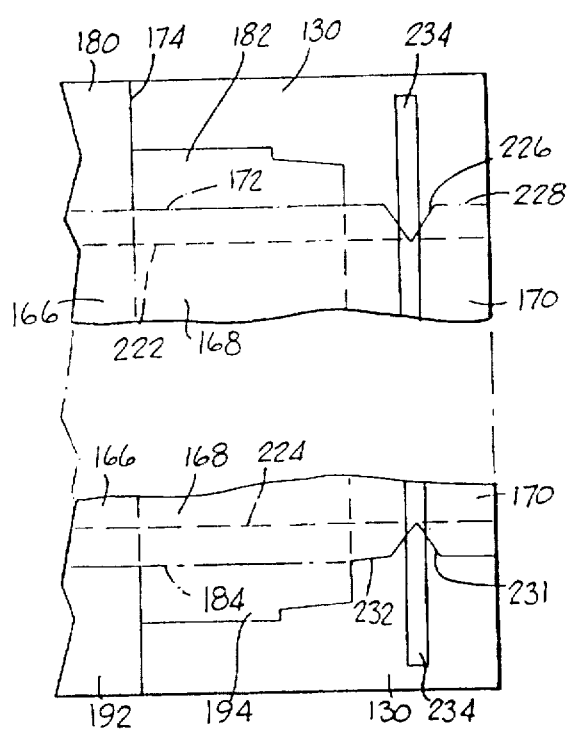
FIG. 33 is an enlarged view of portion of FIG. 32.

In FIGS. 32 and 33, which are similar to FIG. 24, there is illustrated another preferred embodiment of the carton blanks illustrated in FIGS. 10 and 14 and in which corresponding parts are identified with the same reference numerals. When the continuous strips 130 of the relatively flexible material are fed into the apparatus of FIG. 7, there is a maximum tolerance distance that the lower edge 222 of the upper continuous strip 130 can be spaced from the fold line 172 and that the upper edge 224 of the lower continuous strip 130 can be spaced from the fold line 184. A cut-out 226 is formed in the upper portion of the glue tab panel portion 170 and extends downwardly from the upper edge 228 for a distance substantially equal to the maximum tolerance distance. Also, a cut-out 231 is formed in the lower portion of the glue tab panel portion 170 and extends upwardly from the lower edge 232 for a distance substantially equal to the maximum tolerance distance. Although the cut-outs 226 and 230 are illustrated as V-shaped, it is understood that they can be of other geometrical configurations. Also, although the cut-out portions 226 and 231 are illustrated as extending completely through the glue tab panel portion 170, it is understood that they can extend only partially through the glue tab panel portion 170. When a carton is formed from the carton blank of FIGS. 10, 14 and 22 by folding around the fold lines 160, a continuous bead 234 of adhesive, such as a hot melt adhesive, is superposed over the upper continuous strip 130, the cut-out 226, the glue tab panel portion 170, the cut-out 230 and the lower continuous strip 130 so that these portions may be secured to superposed portions of the continuous film 136 of FIG. 10 or the continuous coating 230 of FIG. 14.

Figure 34:
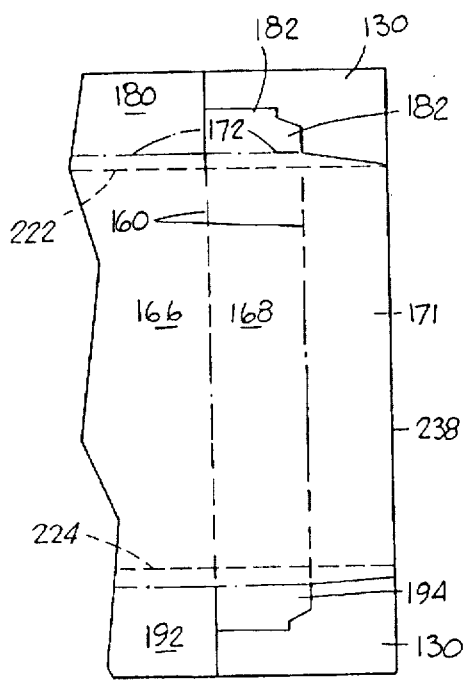
FIG. 34 is a partial top plan view of another preferred embodiment of the invention.
Figure 35:
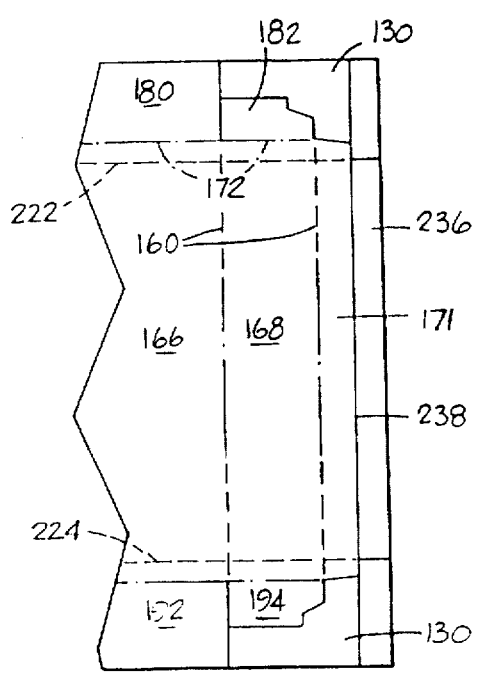
FIG. 35 is a view similar to FIG. 34 after one folding operation.

In FIGS. 34 and 35, there is illustrated another preferred embodiment of the carton blanks illustrated in FIGS. 10 and 14 and in which corresponding parts are identified with the same reference numerals. The glue tab panel portion 171 is wider than the glue tab panel portion 170 and the upper and lower continuous strips 130 and the continuous film are wider. Prior to the folding of the carton blank around the fold lines 160, portions 236 of the upper and lower continuous strips 130 and the glue tab panel portion 171 and the adhesively secured portion of the continuous film 136 are folded back over and secured to adjacent portions of the upper and lower continuous strips 130 and the glue tab panel portion 171. When a carton is formed from the carton blank, a bead (not shown) of adhesive, such as a hot melt adhesive, is superposed over the edge 238 formed by the folded over portions 236.

Figure 36:
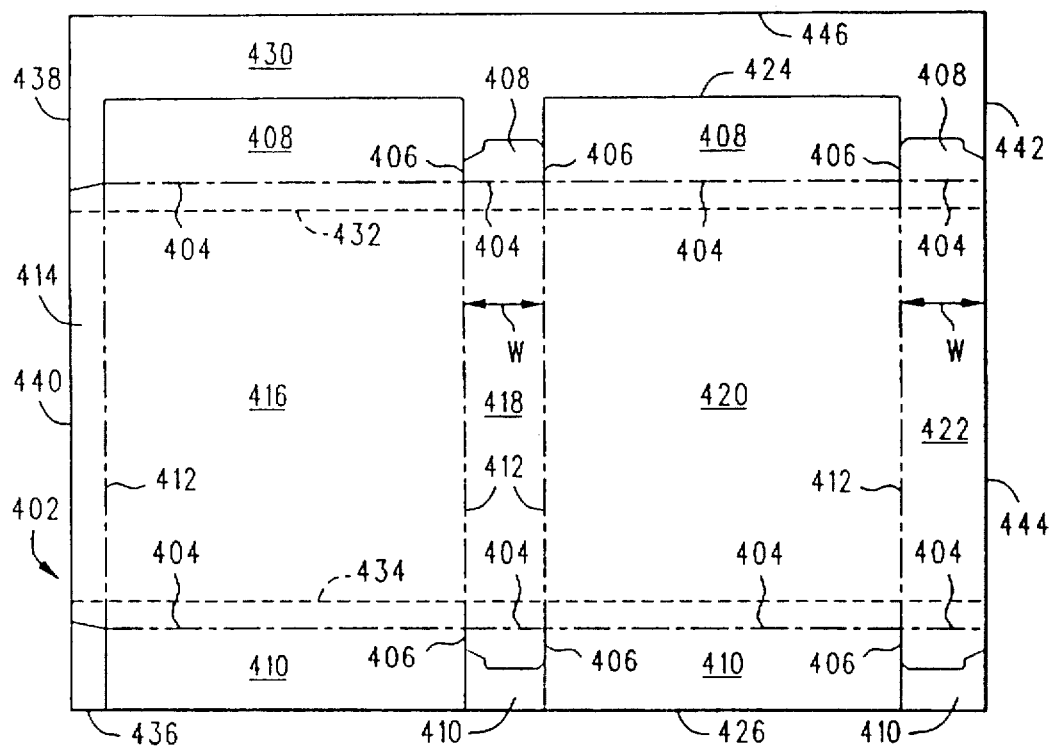
FIG. 36 is a top plan view of the outer portion of a carton blank of another preferred embodiment of the invention.

In FIG. 36, there is illustrated a carton blank of another preferred embodiment of the invention. The carton blank comprises a unitary sheet 402 of a relatively rigid material provided with fold lines 404 and cut lines 406 to form top wall panels 408 and bottom wall panels 410. The unitary sheet 402 is further provided with fold lines 412 to form a glue tab panel 414, a back sidewall panel 416, a left sidewall panel 418, a front sidewall panel 420 and a right sidewall panel 422. The unitary sheet 402 has a top edge 424 on the top panels 408 integral with the front and back panels 416 and 420 and a bottom edge 426 on the bottom panels 410 integral with the front and back panels 416 and 420.

A sheet 430 of a relatively flexible fluid impervious material having a rectangular configuration has a central body portion located between the lines 432 and 434 that is superposed over and secured to a corresponding central body portion of the unitary sheet 402 of a relatively rigid material. The sheet 430 has a bottom edge 436 that coincides with the bottom edge 426 of the unitary, a left side edge 438 a portion of which coincides with a left side edge 440 of the unitary sheet 402 and a right side edge 442 a portion of which coincides with the right side edge 444 of the unitary sheet 402. The sheet 430 of a relatively flexible fluid impervious material has a top edge 446 that is spaced a distance from the top edge 424 of the unitary sheet 402 of a relatively rigid material. The distance the top edge 446 is spaced from the fold lines 404 preferably is equal to at least about one-half inch greater than the width W of a sidewall 418 or 422.

In forming a carton from the carton blank of FIG. 36, the unitary sheet 402 and the sheet 430 are folded around the fold lines 412 and the glue tab panel 414 is secured to a portion of the sheet 430 secured to the sidewall panel 422 and overlying portions of the sheet 430 extending upwardly and downwardly from the portion of the sheet 430 secured to the glue tab panel and the corresponding portion of a portion of the sheet 430 secured to one of the opposite sidewall panels are secured together to form a continuous inner surface. The bottom portion of the sheet 430 superposed over the bottom panels 410 is folded and secured together and the bottom panels 410 are folded and secured together to form a bottom closed end portion (not shown) to form an enclosure having a closed bottom end and an open top end. This enclosure is then filled with the desired amount of a material. The securing line 432 securing the sheet 430 of a relatively flexible fluid impervious material to the unitary sheet 402 of a relatively rigid material lies in a common plane.

Figure 37:
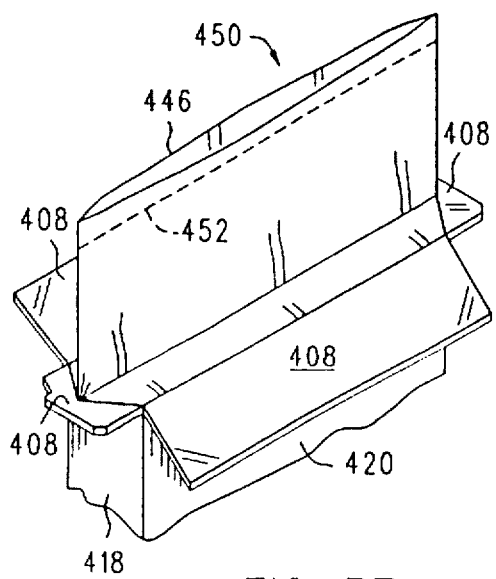
FIG. 37 is perspective view of the top portion of a partially formed carton form the carton blank of FIG. 36.
Figure 38:
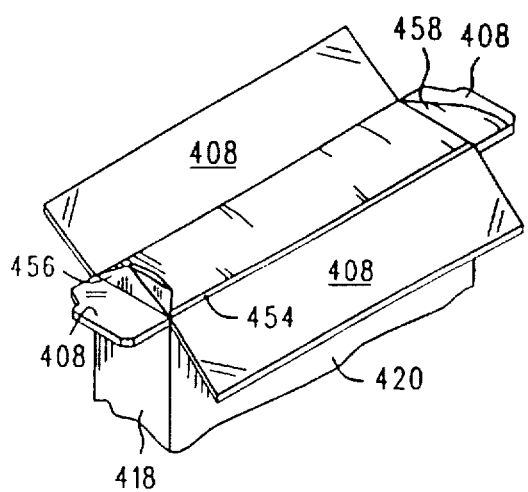
FIG. 38 is a perspective view of the top portion of FIG. 37 partially folded to form one type closure.

In FIGS. 37 and 38, there is illustrated the formation of one embodiment of a top closure for the top portion 450 of the sheet 430 of a relatively flexible fluid impervious material. The upper portion of the top portion 450 are folded and secured together. The top portion 450 is folded half to form a first folded portion (not shown) in which the top edge 446 is substantially in the common plane. The first folded portion is then folded to form a second folded portion, FIG. 38, comprising the first folded portion folded to a position parallel to the common plane. The second folded portion has an edge portion 454 substantially in contact with the fold line between the top panel 408 and the front wall panel 420. As illustrated in FIG. 3, the end 456 of the second folded portion has been folded through ninety degrees and the end 458 is in the plane parallel to the common plane. The carton is finished by folding the end 454 through another ninety degrees and folding the end 456 through one hundred and eighty degrees and folding and sealing the top panels 408.

Figure 39:
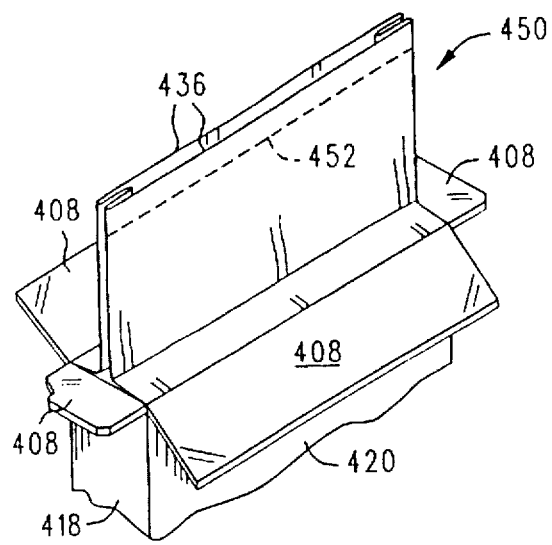
FIGS. 39 and 40 are perspective view of the top portion of FIG. 37 folded to form another type of closure.
Figure 40:
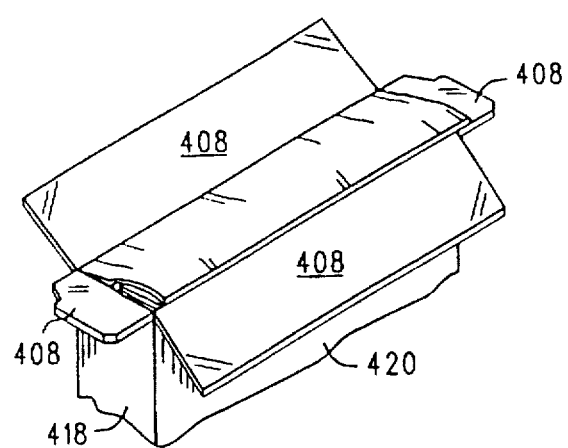

In FIGS. 39–40, there is illustrated the formation of another embodiment of a top closure for the top portion 450 of the sheet 130 of a relatively flexible fluid impervious material. The upper portion of the top portion 450 between the line 452 and the top edge 446 are folded and secured together. The top portion is folded in half to form a first folded portion (not shown) in which the top edge 436 is substantially in the common plane. The first folded portion is then folded to form a second folded portion, FIG. 40, comprising the first folded portion folded over to be parallel to the common plane and with the edge portion 454 substantially in contact with the fold line between the top panel 408 and the front wall panel 420.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A carton blank comprising:

a unitary sheet of a relatively rigid material having an inner surface and an outer surface;

said unitary sheet of a relatively rigid material having a left side edge, a right side edge, a top edge and a bottom edge;

said unitary sheet of a relatively rigid material having a plurality of cut and fold lines for dividing said unitary sheet of relatively rigid material into a front panel portion, a back panel portion and opposite sidewall panel portions, a glue tab panel portion, and top and bottom panel portions extending outwardly in opposite directions from said front wall, back wall and opposite sidewall panel portions;

said unitary sheet of a relatively rigid material having a length extending from said top edge to said bottom edge and a width extending in a direction perpendicular to said length;

a sheet of a relatively flexible fluid impervious material having portions thereof superposed over said inner surface of at least said top panel portions and at least portions of said front and back panel portions, said opposite sidewall panel portions and said glue tab panel portion;

securing means extending between said right side edge and said left side edge for securing at least a first portion of said sheet of a relatively flexible fluid impervious material to at least portions of said front and back panel portions, said opposite sidewall panel portions and said glue tab panel portion;

said sheet of a relatively flexible fluid impervious material having a top edge spaced from and parallel to said top edge of said unitary sheet of a relatively rigid material;

said sheet of a relatively flexible fluid impervious material having a left side edge and a right side edge and a width substantially the same as the width between said left side edge and said right side edge of said unitary sheet of a relatively rigid material; and said top edge of said sheet of a relatively flexible fluid impervious material being spaced from said fold lines between said front, back and opposite sidewall panels and said top panels a distance at least equal to one-half inch greater than the width of one of said opposite sidewall panel portions.

2. A carton blank as in claim 1 wherein:

said top panel portions having at least a top front panel portion and a top back panel portion;

said top edge of said unitary sheet of a relatively rigid material comprises at least one of said top front panel portion and said top back panel portion.

3. A carton blank as in claim 1 wherein said sheet of a relatively flexible fluid impervious material comprises:

a plastic material.

4. A carton blank as in claim 1 wherein said sheet of a relatively flexible fluid impervious material comprises:

a plastic coated kraft paper.

5. A carton blank comprising:

a unitary sheet of a relatively rigid material having an inner surface and an outer surface;

said unitary sheet of a relatively rigid material having a left side edge, a right side edge, a top edge and a bottom edge;

said unitary sheet of a relatively rigid material having a plurality of cut and fold lines for dividing said unitary sheet of a relatively rigid material into a front panel, a back panel, opposite sidewall panels, a glue tab panel and a plurality of top and bottom panels extending outwardly in opposite directions from said front, back and opposite sidewall panels and joined thereto by fold lines;

said inner surface of said front, back and opposite sidewall panels and said glue tab panel portion having a central body portion, a top body portion and a bottom body portion;

said central body portion located between and spaced from said fold lines between said front, back and opposite sidewall panels and said plurality of top panels and said fold lines between said front, back and opposite sidewall panels and said plurality of bottom panels and extending into said glue tab panel;

a rectangular sheet of a relatively flexible, fluid impervious material having a central body portion;

said central body portion of said rectangular sheet of a relatively flexible fluid impervious material being secured to said central body portion of said front, back and opposite sidewall panels and said glue tab panel;

said rectangular sheet of a relatively flexible fluid impervious material having a top body portion and a bottom body portion;

at least portions of said top body portion of said rectangular sheet of a relatively flexible fluid impervious material overlying but not secured to said top panels and said top body portion of said front, back and opposite sidewall panels and said glue tab panel;

at least portions of said bottom body portion of said rectangular sheet of a relatively flexible material overlying but not secured to said plurality of bottom panels portions and said bottom body portion of said front, back and opposite sidewall panels and said glue tab panel;

said unitary sheet of a relatively rigid material having a length extending from said top edge to said bottom edge and a width extending from said left side edge to said right side edge;

said top body portion of said sheet of a relatively flexible impervious material having a top edge spaced from and parallel to said top edge of said unitary sheet of a relatively rigid material;

said top body portion of said sheet of a relatively flexible fluid impervious material having a left side edge and a right side edge and a width substantially the same as the width between said left side edge and said right side edge of said unitary sheet of a relatively rigid material; and said top edge of said top body portion of said sheet of relatively flexible fluid impervious material being spaced from said fold lines between said front, back and opposite sidewall panels and said top panels a distance at least equal to one-half inch greater than the width of one of said opposite sidewall panels.

6. A carton blank as in 5 and further comprising:

a first sheet of a relatively flexible material secured to said top body portion of said sheet of a relatively flexible fluid impervious material; and a second sheet of a relatively flexible material secured to said bottom body portion of said sheet of a relatively flexible fluid impervious material.

7. A carton blank as in claim 6 wherein:

said first and second sheets of a relatively flexible material comprise a kraft paper.

8. A carton blank as in claim 5 wherein:

said rectangular sheet of a relatively flexible fluid impervious material is formed from a plastic material.

9. A carton blank as in claim 5 wherein:

said rectangular sheet of a relatively flexible fluid impervious material is formed from a plastic coated kraft paper.

10. A carton formed from a carton blank comprising a unitary sheet of a relatively rigid material having an inner surface and an outer surface; said unitary sheet of a relatively rigid material having a left side edge, a right side edge, a top edge and a bottom edge; said unitary sheet of a relatively rigid material having a plurality of cut and fold lines for dividing said unitary sheet of a relatively rigid material into a front panel, a back panel, opposite sidewall panels, a glue tab panel and a plurality of top and bottom panels extending outwardly in opposite directions from said front, back and opposite sidewall panels and joined thereto by fold lines; said inner surface of said front, back and opposite sidewall panels and said glue tab panel portion having a central body portion, a top body portion and a bottom body portion; said central body portion located between and spaced from said fold lines between said front, back and opposite sidewall panels and said plurality of top panels and said fold lines between said front, back and opposite sidewall panels and said plurality of bottom panels and extending into said glue tab panel; a rectangular sheet of a relatively flexible, fluid impervious material having a central body portion; said central body portion of said rectangular sheet of a relatively flexible fluid impervious material being secured to said central body portion of said fron, back and opposite sidewall panels and said glue tab panel; said rectangular sheet of a relatively flexible fluid impervious material having a top body portion and a bottom body portion; at least portions of said top body portion of said rectangular sheet of a relatively flexible fluid impervious material overlying but not secured to said top panels and said top body portion of said front, back and opposite sidewall panels and said glue tab panel; at least portions of said bottom body portion of said rectangular sheet of a relatively flexible material overlying but not secured to said plurality of bottom panels portions and said bottom body portion of said front, back and opposite sidewall panels and said glue tab panel; said unitary sheet of a relatively rigid material having a length extending from said top edge to said bottom edge and a width extending from said left side edge to said right side edge; said top body portion of said sheet of a relatively flexible impervious material having a top edge spaced from and parallel to said top edge of said unitary sheet of a relatively rigid material; said top body portion of said sheet of a relatively flexible fluid impervious material having a left side edge and a right side edge and a width substantially the same as the width between said left side edge and said right side edge of said unitary sheet of a relatively rigid material; and said top edge of said top body portion of said sheet of relatively flexible fluid impervious material being spaced from said fold lines between said front, back and opposite sidewall panels and said top panels a distance at least equal to one-half inch greater than the width of one of said opposite sidewall panels comprising:

said unitary sheet of said relatively rigid material and said sheet of a relatively flexible fluid impervious material being folded and sealed to form an open ended enclosure comprising a front wall portion, a back wall portion and at least two opposite sidewall portions and top and bottom panel portions and a continuous inner surface comprising said generally rectangular sheet of a relatively flexible fluid impervious material;

said bottom body portions of said sheet of a relatively flexible fluid impervious material and said bottom body portion of said sheet of a relatively rigid material and said bottom panel portions being folded and secured together to form a bottom closed end so that the partially formed carton can be filled with material;

the top edge portion of said central body portin lying substantially in a common plane;

facing portions of said sheet of a relatively flexible fluid impervious material adjacent to said top edge thereof being secured together;

the portion of said sheet of a relatively flexible fluid impervious material extending upwardly from said common plane being folded over until at least a portion of said top edge thereof is in said common plane to form a first folded portion;

said first folded portion being folded over to form a second folded portion comprising superposed portions of said first folded portions;

said second folded portion lying in a plane parallel to and substantially in contact with said common plane; and sealing together said top panel portions.

11. A Carton as in claim 10 wherein:

said portion of said sheet of a relatively flexible fluid impervious material extending upwardly from said common plane being folded to form a gable joint.

12. A carton as in claim 10 and further comprising:

said second folded portion being folded so that a widthwise extending edge portion thereof is substantially in contact with said fold line between one of said top panel portions and either of said front and back panel portions.

13. A method for forming a carton from a carton blank comprising; a unitary sheet of a relatively rigid material having an inner surface and an outer surface; said unitary sheet of a relatively rigid material having a left side edge, a right side edge, a top edge and a bottom edge; said unitary sheet of a relatively rigid material having a plurality of cut and fold lines for dividing said unitary sheet of a relatively rigid material into a front panel, a back panel, opposite sidewall panels, a glue tab panel and a plurality of top and bottom panels extending outwardly in opposite directions from said front, back and opposite sidewall panels and joined thereto by fold lines; said inner surface of said front, back and opposite sidewall panels and said glue tab panel portion having a central body portion, a top body portion and a bottom body portion; said central body portion located between and spaced from said fold lines between said front, back and opposite sidewall panels and said plurality of top panels and said fold lines between said front, back and opposite sidewall panels and said plurality of bottom panels and extending into said glue tab panel; a rectangular sheet of a relatively flexible, fluid impervious material having a central body portion; said central body portion of said rectangular sheet of a relatively flexible fluid impervious material being secured to said central body portion of said fron, back and opposite sidewall panels and said glue tab panel; said rectangular sheet of a relatively flexible fluid impervious material having a top body portion and a bottom body portion; at least portions of said top body portion of said rectangular sheet of a relatively flexible fluid impervious material overlying but not secured to said top panels and said top body portion of said front, back and opposite sidewall panels and said glue tab panel; at least portions of said bottom body portion of said rectangular sheet of a relatively flexible material overlying but not secured to said plurality of bottom panels portions and said bottom body portion of said front, back and opposite sidewall panels and said glue tab panel; said unitary sheet of a relatively rigid material having a length extending from said top edge to said bottom edge and a width extending from said left side edge to said right side edge; said top body portion of said sheet of a relatively flexible impervious material having a top edge spaced from and parallel to said top edge of said unitary sheet of a relatively rigid material; said top body portion of said sheet of a relatively flexible fluid impervious material having a left side edge and a right side edge and a width substantially the same as the width between said left side edge and said right side edge of said unitary sheet of a relatively rigid material; and said top edge of said top body portion of said sheet of relatively flexible fluid impervious material being spaced from said fold lines between said front, back and opposite sidewall panels and said top panels a distance at least equal to one-half inch greater than the width of one of said opposite sidewall panels comprising:

folding said unitary sheet of a relatively rigid material around some of said fold lines and sealing said glue tab panel to one of said front and back wall panels and sealing together portions of said sheet of relatively flexible material and folding and sealing together said bottom panels to form an enclosure having one closed end and one open end with the top edges of said central body portions lying substantially in a common plane;

filling said enclosure with a desired material;

securing together facing portions of said sheet of a relatively flexible fluid impervious material adjacent to said top edge thereof;

folding the portion of said sheet of a relatively flexible fluid impervious material extending upwardly from said common plane until said top edge thereof substantially touches said common plane to form a first folded portion; and folding said first folded portion to form a second folded portion comprising superposed portions of said first folded portion lying substantially in a plane parallel to said common plane.

14. A method as in claim 13 and further comprising:

folding said first folded portion so that said second folded portion has a widthwise extending edge portion parallel to said common plane; and folding said second folded portion so that said widthwise extending edge portion is substantially in contact with said top panels and either of said front and back wall panels.

\* \* \* \* \*

UNITED STATES PATENT AND TRADEMARK OFFICE
CERTIFICATE OF CORRECTION

PATENT NO. : 5,794,812
DATED : August 18, 1998
INVENTOR(S) : Walsh

It is certified that error appears in the above-identified patent and that said Letters Patent is hereby corrected as shown below:

| | |
|---|---|
| Column 1, Line 44 | "width" should read --with-- |
| Column 2, Line 8 | "a least" should read --at least-- |
| Column 2, Line 42 | "material fluid impervious" should read --fluid impervious material-- |
| Column 4, Line 24 | "form" should be --from-- |
| Column 5, Line 33 | "a polyethylene" should read --as polyethylene-- |
| Column 6, Line 2 | insert "," after --42-- |
| Column 7, Line 41 | "porion" should read --portion-- |
| Column 7, Line 44 | "purposed" should read --purposes-- |

In The Claims

| | |
|---|---|
| Column 15, line 57 | "fron" should read --front-- |
| Column 16, Line 34 | "portin" should read --portion-- |

UNITED STATES PATENT AND TRADEMARK OFFICE
CERTIFICATE OF CORRECTION

PATENT NO. : 5,794,812
DATED : August 18, 1998
INVENTOR(S) : Walsh

It is certified that error appears in the above-identified patent and that said Letters Patent is hereby corrected as shown below:

Column 17, Line 18        "fron" should read "front--

Signed and Sealed this

Twenty-third Day of February, 1999

Attest:

Q. TODD DICKINSON

*Attesting Officer*        *Acting Commissioner of Patents and Trademarks*